(12) United States Patent
Inkinen

(10) Patent No.: US 7,391,300 B2
(45) Date of Patent: Jun. 24, 2008

(54) SYSTEM FOR PROVIDING ALERT NOTIFICATIONS FOR A COMMUNICATION DEVICE

(75) Inventor: Mikko Inkinen, Salo (FI)

(73) Assignee: Nokia Corporation, Espoo (FI)

( * ) Notice: Subject to any disclaimer, the term of this patent is extended or adjusted under 35 U.S.C. 154(b) by 538 days.

(21) Appl. No.: 11/145,015

(22) Filed: Jun. 3, 2005

(65) Prior Publication Data

US 2006/0277579 A1    Dec. 7, 2006

(51) Int. Cl.
*G08B 3/00* (2006.01)
(52) U.S. Cl. .................. 340/384.1; 340/692; 455/412.2
(58) Field of Classification Search ............. 340/384.1, 340/692; 455/412.1, 412.2
See application file for complete search history.

(56) References Cited

U.S. PATENT DOCUMENTS

| | | | | |
|---|---|---|---|---|
| 5,568,122 | A * | 10/1996 | Xydis ...................... | 340/384.1 |
| 5,657,004 | A * | 8/1997 | Whittaker et al. ........... | 340/692 |
| 6,008,723 | A * | 12/1999 | Yassan ...................... | 340/692 |
| 6,411,207 | B2 * | 6/2002 | Shaffer ...................... | 340/692 |
| 6,731,206 | B2 * | 5/2004 | Yang et al. ................. | 340/692 |
| 6,930,600 | B1 * | 8/2005 | Hsieh ...................... | 340/384.1 |
| 7,312,697 | B2 * | 12/2007 | Veliu et al. ............... | 455/412.2 |
| 2002/0065036 | A1 * | 5/2002 | Sakata et al. ................ | 455/412 |
| 2003/0027562 | A1 | 2/2003 | Nishimura et al. | |
| 2005/0014515 | A1 | 1/2005 | Suzuki | |
| 2005/0157685 | A1 | 7/2005 | Gu et al. | |

OTHER PUBLICATIONS

MP3 Trimmer—edit your MP3s fast and easy, http://deepniner.net/mp3trimmer/archive (as found on the Internet), Sep. 1, 2005.
U.S. Appl. No. 11/321,655, filed Dec. 28, 2005, M. Rytivaara et al.

* cited by examiner

*Primary Examiner*—John Tweet, Jr.
(74) *Attorney, Agent, or Firm*—Ware, Fressola, Van Der Sluys & Adolphson LLP

(57) ABSTRACT

Applications (11*b* 11*d*) and data files (11*a* 11*c* 11*e*) for a communication device (10) enabling the device to use a segment of a media or multimedia file (11*a*) (an audio file or one or more components of an audio-video file) stored in the communication device (10) to alert a user of the communication device (10) to the occurrence of an event, and to do so in a way that conserves memory. The invention provides an offset selector application (11*b*) by which a user is able to indicate that a particular segment of the media file (11*a*) is to be used to signal the occurrence of an event. Instead of storing the segment in the communication device (10), the offset selector application (11*b*) typically stores only offsets (21*a* 21*b*) in respect to the media file (11*a*), and the offsets are used in combination with the media file (11*a*) to provide the alert notification.

26 Claims, 2 Drawing Sheets

| Alert source file | Offset1 | Offset2 | Event |
|---|---|---|---|
| path:filename1 | 1'30" | 1'40" | call from calling number |
| path:filename1 | 1'20" | 1'30" | other calls |
| path:filename2 | 1'30" | 3'30" | time=0600H |
| path:filename3 | 4'10" | 4'13" | sms from sms sender |
| path:filename3 | 4'10" | 4'13" | other sms messages |
| path:filename4 | 2'10" | 2'13" | (any) IRC |
| path:filename1 | 1'10" | 2'13" | time=1700H |
| " | 3'10" | 3'23" | |
| path:filename 2 | 2'10" | 2'13" | |
| " | 1'10" | 1'23" | |

SYSTEM FOR PROVIDING ALERT NOTIFICATIONS FOR A COMMUNICATION DEVICE

TECHNICAL FIELD

The present invention pertains to the field of telecommunications. More particularly, the present invention pertains to providing clips of media or multi-media files (audio files or one or more components of audio-video files) for use in alerting users to the occurrence of other kinds of events besides the arrival of an incoming call.

BACKGROUND ART

In many situations today a user of a communication device such as a mobile phone wants to know who's calling. To this end, makers of communication devices today typically provide a way for a user to associate with a calling number (or simply with a call irrespective of who's calling) a particular sound (including music) to serve as a ring tone. Such a ring tone could be, e.g. a portion of an audio file stored in the communication device, or at least the audio portion of an audio-video file. Users today can also use clips of audio-video files (including what are sometimes called music video files) for ring tones.

Besides wanting to know who's calling, users of communication devices today sometimes use such devices for (sending and) receiving SMS (short message service) mail, email, or other digital messages. And users can configure their communication devices to indicate the sender of an email (or simply that an email has arrived) by having the communication device emit a distinct sound to serve as what is more aptly called an alert notification, alerting the user that an email from a particular sender (or irrespective of the particular sender) has arrived. The distinct sound could be, again, a portion of an audio file.

Further, many communication devices are configurable by the user to emit a distinct sound in case of other events. A simple example is the event of a certain time, i.e. the user configures the communication device to serve as an alarm clock, and arranges that a particular sound be produced by the communication device, and again, the user might want the sound to be a portion of an audio file (or the audio portion of an audio-video file).

So there are, in principle, many different events for which a user might want to associate distinct sounds or segments/clips of audio or audio-video files. To actually store in a communication device a segment of an audio (or audio-video) file for each different possible event a user might want to be alerted to can consume a significant portion of the memory of a communication device. Thus, since in general memory in a communication device is advantageously used prudently, it would be useful to store or otherwise indicate in a communication device many different clips of audio or audio-video files (or even simply pure video), but in a way that conserves memory.

DISCLOSURE OF THE INVENTION

Accordingly, in a first aspect of the invention, a method is provided, comprising: storing in a communication device an offset and a further offset in respect to a starting point of an alert source file (a media or a multimedia file) containing information used to indicate audio or video signals (or both), and so indicating a partial segment of the alert source file; and using the indicated segment of the alert source file as an alert notification to signal to a user of the communication device the occurrence of an event.

In accord with the first aspect of the invention, the offset and the further offset may be stored in a text file. Alternatively, they may be stored as fields of a record in a file of records of a database. As another alternative, they may be stored as metadata of the alert source file.

Also in accord with the first aspect of the invention, either the offset or the further offset may indicate the start or the end of the alert source file and may have either a null value or a value indicating the start or the end of the alert source file.

Also in accord with the first aspect of the invention, the method may further comprise a step of storing with the offset and the further offset information indicating a name or other identifier for the alert source file.

Also in accord with the first aspect of the invention, the method may further comprise a step of receiving an indication of contact information to another communication device so as to associate the contact information with the indicated segment, and using the indicated segment as an alert notification to signal the occurrence of an event involving the other communication device. The event may be an arrival of a call from the other communication device. Alternatively, the event may be an arrival of an email or other text message from the other communication device.

Also in accord with the first aspect of the invention, the method may further comprise a step of receiving from a user an indication of a time at which an alert is to be provided to the user, and using the indicated segment as an alert notification to signal the arrival of the indicated time.

Still also in accord with the first aspect of the invention, the method may further comprise a step of providing to a user an interface by which the user is able to indicate to the communication device the offset and the further offset.

Even still also in accord with the first aspect of the invention, a plurality of offset pairs indicating offsets into the alert source file and possibly into other alert source files may be stored for use as a single alert notification to signal to the user of the communication device the occurrence of the event, whereby a concatenation of two or more segments of one or more alert source files is indicated as an alert notification.

Also in accord with the first aspect of the invention, the communication device storing the offsets may be a wireless communication device. Further, the communication device may include functionality of a mobile terminal for communicatively coupling to a radio access network of a wireless communication system. Relatedly, the communication device may include functionality for wireless communication with another wireless communication device via a communication path that at least in part includes wireless signalling.

In a second aspect of the invention, a computer program product is provided comprising: a computer readable storage structure embodying computer program code thereon for execution by a computer processor, wherein the computer program code includes instructions for performing the steps of a method according to the first aspect of the invention.

In a third aspect of the invention, a computer program product is provided for defining event notifications, comprising: a computer readable storage structure embodying computer program code thereon for execution by a computer processor included in a host device, wherein said computer program code includes instructions for: defining an offset and a further offset in respect to a starting point of an alert source file containing information used to indicate at least either audio or video signals, and so indicating a partial segment of the alert source file; and storing in a memory storage the information that indicates the said partial segment to the device to be used in an event notification. The memory storage may be part of a device other than the host device, and the instructions for storing the information may include instructions for sending the information to the other device. Alternatively, the memory storage may be part of the host device.

In a fourth aspect of the invention, a communication device is provided, comprising means for performing a method according to the first aspect of the invention.

Thus, with the invention, instead of having to store as a separate file each clip of a media or multimedia file (i.e. an audio, or audio-video or even pure video file) to be used as an alert notification (for alerting the user to the occurrence of an event), there is merely a file holding offsets of an audio/video file. This allows the creation of many alert notifications from a media or multimedia file without having to store each alert notification in the memory of the communication device. In addition, the invention also enables a user to choose different portions of a media or multimedia file to be played, and arrange them to be played in a desired sequence, without copying and separately saving to memory any portions of the media or multimedia files.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1:
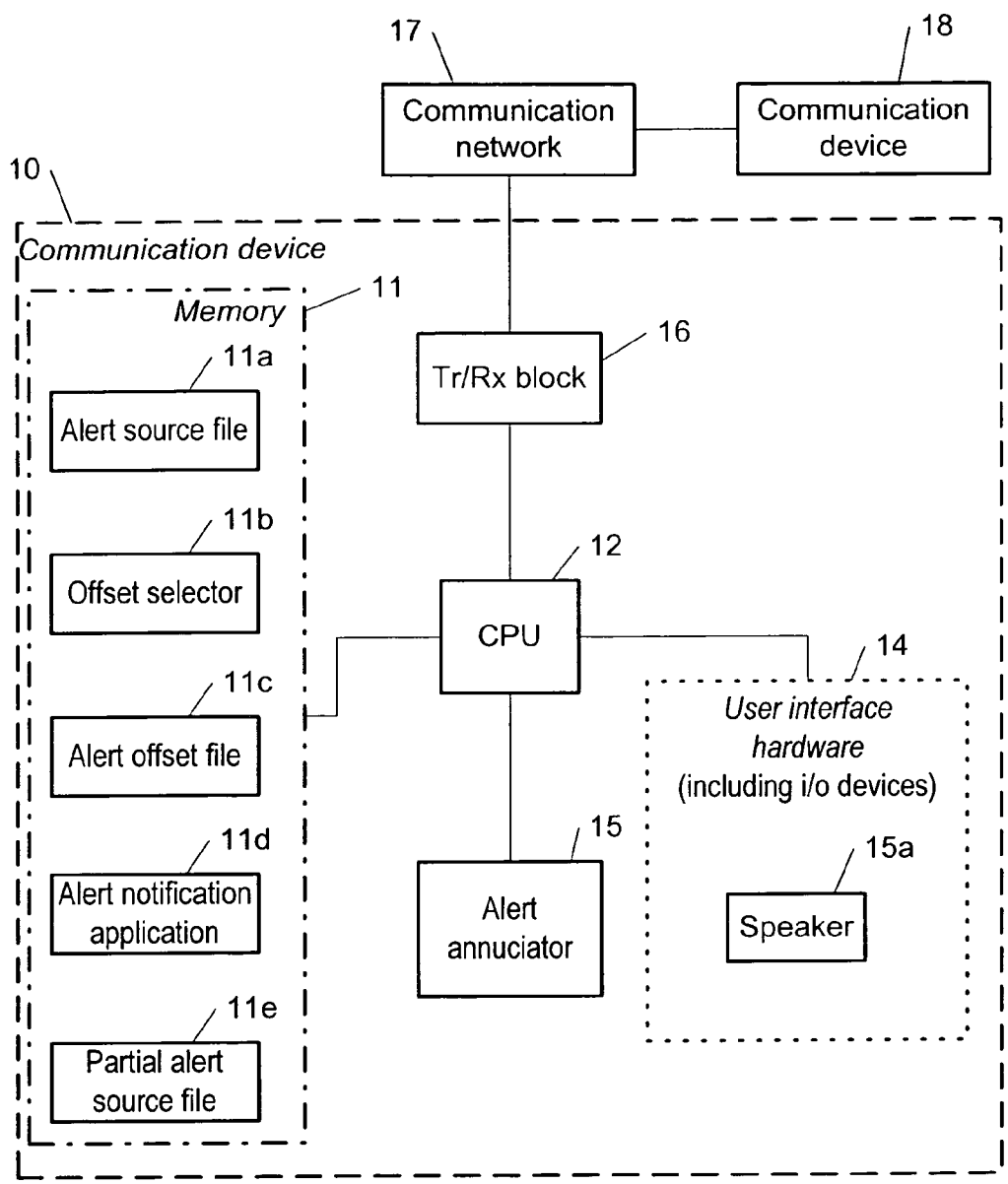
FIG. 1 is a block diagram of a communication device for storing and producing an alert notification (e.g. a sound serving as a ring tone), according to the invention.
Figure 2:
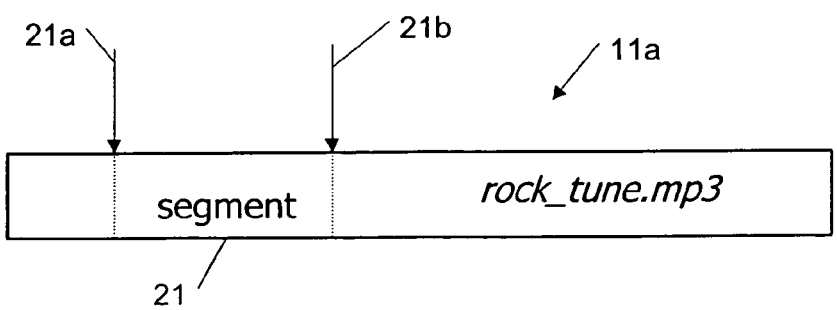
FIG. 2 is a schematic illustrating offsets of an alert source file (e.g. an audio file or a music video) to indicate a segment of the multimedia file, according to the invention.
Figures 3, 4:
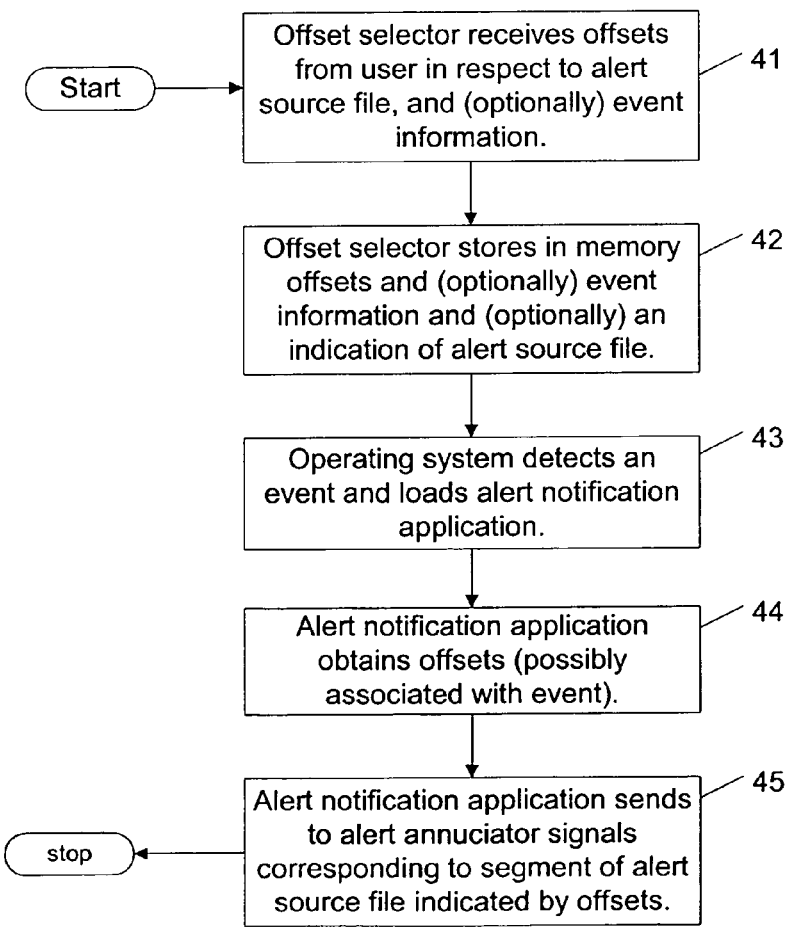
FIG. 3 is a schematic illustrating a data store for holding information used to produce an alert notification, according to the invention.
FIG. 4 is a flow chart illustrating operation of a communication device, according to the invention.

Referring now to FIGS. 1-3, the invention provides a communication device 10 including an alert offset file 11c stored in a (nonvolatile) memory device 11 and hosting offsets 21a 21b (FIG. 2) indicating time offsets (e.g. 1'30", i.e. one minute and 30 seconds) from the start of a segment 21 of a media or multimedia file 11a (i.e. a segment of an audio or audio-video or video file), what is here called the alert source file. (Of course offsets could also be indicated in other ways, e.g. as a percentage of the alert source file, e.g. 2.5% into the alert source file.) A typical event is the arrival of some communication (a voice call or digital message) from another communication device 18, via a communication network 17, which may be, e.g. a wireless communication network, but may also be a communication network including the Internet, or may be another kind of wireless communication network (e.g. a wireless LAN), or even a wireline communication network. In case the communication network 17 is e.g. a wireless communication network, the communication device 10 is so-called user equipment for wireless communication (e.g. a mobile station) and includes a transceiver (Tr/Rx) 16 (including all hardware) for providing radio signals for communicating with other communication devices via the communication network 17 (or for communicating with content servers part of, or communicatively coupled to the communication network).

The alert offset file 11c typically includes not only the offsets 21a 21b, but also (FIG. 3) an indication of the corresponding alert source file (in case more than one alert source file is used to provide segments for alert notification), with the indication of the alert source file including a path if such is of use to the operating system (not shown) of the communication device. Thus, the alert offset file includes typically a record for each different clip from the alert source file the user of the communication device would like to have the communication device provide, when one or another event (or kind of event) occurs. FIG. 3 indicates a typical record structure 31, i.e. the different fields (alert source file, i.e. name and any path, offset 1, offset 2, and event) for each record in the alert sound offset file 11c.

In a typical embodiment of the invention, and now referring also to FIG. 4, in a first step 41 an offset selector (application) 11b is loaded (by the operating system) into a CPU 12 of the communication device 10, and, via the user interface hardware 14 of the communication device, provides to a user an interface (screens, dialog boxes, prompts) by which the user is able to indicate for the alert source file 11a the offsets 21a 21b (at least one, in case the beginning or end of the alert source file is to serve as the other), and so indicate the segment 21 of the alert source file 11a to serve as an alert notification (e.g. a ringing tone). The interface typically enables the user to select one or another media or multimedia file as an alert source file, and to associate an event or a class of events with the segment serving as an alert notification. Thus, the offset selector receives from the user (via the user interface), offsets in respect to an alert source file (a media or multimedia file) indicating a segment of the alert source file to use for an alert notification, and possibly an indication of the event (e.g. a digital message from a particular sender) or class of events (e.g. any SMS message) for which the alert notification is to be provided.

In a next step 42, the offset selector 11b (using possibly other components of the software functionality hosted by the device, such as e.g. a database manager application, not shown) stores in memory the offsets and (optionally) event information and (optionally) an indication of the alert source file, as the alert offset file 11c. This file can be a structured database, i.e. a file of records having fields, and it may or may not be indexed (and so have an associated index file). Alternatively, it can be a simple text file, with each line (separated by a line feed) corresponding to a different event notification. As another alternative, the offsets and optional event information can be stored in what is called the metadata of the alert source file in case the alert source file is e.g. what is commonly called a Windows Media File as provided by Microsoft Corporation.

In a next step 43, a processor of the communication device, and more particularly the operating system for the communication device, or special interrupt-sensing utilities in close communication with the operating system, detects an event and loads an alert notification application 11d into executable memory.

In a next step 44, the alert notification application 11d obtains the offsets 21a 21b (possibly associated with event) from the alert offset file 11c. The alert notification application 11d typically scans the alert offset file 11c in a first to last order of records or entries and so is able to provide a particular alert notification (segment of an alert source file) for one particular event (e.g. a call from a particular caller) in a class of events (any call), and then another alert notification for any other event in the class of events if the event is in the class, not is not itself specified in the alert sound offset file 11c.

In some embodiments of the invention, e.g. in case of using a clip of the alert source file for a ring tone (to alert the user to the occurrence of an incoming call, as opposed to alerting the user to the occurrence of another kind of event), the offsets may be stored in what is typically called a ring-tone configuration file, and offsets for other kinds of events may be stored in the offset file 11c separate from ring tones used for alerting the user to incoming calls. Of course the ring-tone configuration file could be used as the offset file 11c, and so include offsets for all kinds of events.

In a next step 45, the alert notification application 11d sends to an alert annunciator 15 (a driver application for a speaker 15a in case of sound being used to alert the user, or a driver for input to a video display of the communication device in case of video, or a driver providing both audio and video to a speaker and video display, respectively) signals corresponding to the segment 21 of the alert source file 11a indicated by the offsets, by reading the alert source file beginning with the first offset (or the beginning of the alert source file) and ending with the second offset (or end of the alert source file).

In case of an alert that includes sound for alerting the user to the occurrence of an event, after determining the offsets into the alert source file for the detected event, the alert annunciator 15 uses a decoder (which may be part of the annunciator) to decode the clip of the alert source file to be used for the ring tone, as indicated by the offsets. In the decoding process, the decoder may convert the selected portion of the alert source file from its original format into a PCM (pulse code modulation) audio signal format, and the converted clip is then sent to a digital-to-analog converter and then on to the speaker.

Referring now in particular to FIG. 3, as illustrated in the record having "time=1700H" as the event field value, the invention also encompasses the offset selector application 11b enabling the user to indicate a series of offset pairs, instead of a single offset pair, to alert the user to the occurrence of an event. This is indicated in FIG. 3 by the sequence of records beginning with the "time=1700H" record and continuing to the end of the alert sound offset file 11c to alert the user to quitting time. Thus, the alert in such a case begins with the clip indicated by the first offset, then continues to the clip indicated by the second offset, and so on.

Note also that, as mentioned above in respect to FIG. 4, the invention allows a user to indicate only one offset. If only a start offset is specified by the user, then the selected portion would be from the start offset to the end of file. If only an end offset is specified, then the selected portion would be from the start of the alert source file to the end offset. Correspondingly, the alert offset file includes only the one offset specified by the user and either a null value or a value indicating the start or end of the alert source file for the other offset.

And note that the amount of memory used to specify that ten seconds of a media (or one or more components of a multimedia) file (if indicated by one pair of offsets) is to be played in case of an event is no greater than the memory used to specify that three minutes of the media file is to be played.

In some embodiments of the invention, an actual clip of a media file (or one or more components of a multimedia file) can be saved to a file for possibly faster response to an event. In such embodiments, the offset selector 11b can be commanded to save into a new (partial) media file 11e, separate from the full media file 11a, the clip indicated by the user as the segment to correspond to an event (or class of events), in which case the alert offset file 11c need not indicate offsets, but instead points to the partial media file (i.e. the file containing only the clip to use for the alert). In case of an urgent need to provide an alert as soon as possible after the occurrence of an event, at least a portion of the clip can remain in the executable memory of the CPU 12.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code—i.e. the software or firmware—thereon for execution by a computer processor.

Thus, and now referring again to FIG. 1 and also to FIG. 4, the invention encompasses software providing instructions to a processor of a device by which the device receives from a user an indication of offsets for the alert source file 11a (in step 41), then stores the offsets in the alert offset file 11c (in step 42), and then finally uses the offsets in providing an alert notification (in steps 43-45). Such software is typically hosted by a mobile phone, but may also be hosted by any other wireless communication device. The portions of the software by which the device receives from a user an indication of offsets for the alert source file can be hosted by a personal computer (PC) that can connect or otherwise communicate with a mobile phone or other wireless communication equipment. Thus, the invention allows a person to use a PC to indicate an offset, and then send the offset to a mobile phone where the offset is then stored and used for providing an alert notification.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
    storing in a communication device an offset and a further offset in respect to a starting point of an alert source file containing information used to indicate at least audio or video signals, and so indicating a partial segment of the alert source file; and
    using the indicated segment of the alert source file as an alert notification to signal to a user of the communication device the occurrence of an event.

2. The method of claim 1, wherein the offset and the further offset are stored in a text file.

3. The method of claim 1, wherein the offset and the further offset are stored as fields of a record in a file of records of a database.

4. The method of claim 1, wherein the offset and the further offset are stored as metadata of the alert source file.

5. The method of claim 1, wherein either the offset or the further offset indicates the start or the end of the alert source file and has either a null value or a value indicating the start or the end of the alert source file.

6. The method of claim 1, further comprising a step of storing with the offset and the further offset information indicating a name or other identifier for the alert source file.

7. The method of claim 1, further comprising a step of receiving an indication of contact information to another communication device so as to associate the contact information with the indicated segment, and using the indicated segment as an alert notification to signal the occurrence of an event involving the other communication device.

8. The method of claim 7, wherein the event is an arrival of a call from the other communication device.

9. The method of claim 7, wherein the event is an arrival of an email or other text message from the other communication device.

10. The method of claim 1, further comprising a step of receiving from a user an indication of a time at which an alert is to be provided to the user, and using the indicated segment as an alert notification to signal the arrival of the indicated time.

11. The method of claim 1, further comprising a step of providing to a user an interface by which the user is able to indicate to the communication device the offset and the further offset.

12. The method of claim 1, wherein a plurality of offset pairs indicating offsets into the alert source file and possibly into other alert source files are stored for use as a single alert notification to signal to the user of the communication device the occurrence of the event, whereby a concatenation of two or more segments of one or more alert source files is indicated as an alert notification.

13. The method of claim 1, wherein said communication device is a wireless communication device.

14. The method of claim 13, wherein said communication device includes functionality of a mobile terminal for communicatively coupling to a radio access network of a wireless communication system.

15. A computer program product comprising: a computer readable storage structure embodying computer program code thereon for execution by a computer processor, wherein said computer program code includes instructions for performing the steps of the method of claim 1.

16. A computer program product for defining event notifications, comprising: a computer readable storage structure embodying computer program code thereon for execution by a computer processor included in a host device, wherein said computer program code includes instructions for:

defining an offset and a further offset in respect to a starting point of an alert source file containing information used to indicate at least audio or video signals, and so indicating a partial segment of the alert source file; and storing in a memory storage the information that indicates the said partial segment to the device to be used in an event notification.

17. A computer program product an in claim 16, wherein the memory storage is part of a device other then the host device, and the instructions for storing the information include instructions for sending the information to the other device.

18. A computer program product an in claim 16, wherein the memory storage is part of the host device.

19. A communication device, comprising:

means for storing in the communication device an offset and a further offset in respect to a starting point of an alert source file containing information used to indicate at least audio or video signals, and so indicating a partial segment of the alert source file; and means for using the indicated segment of the alert source file as an alert notification to signal to a user of the communication device the occurrence of an event.

20. The communication device of claim 19, further comprising means for storing with the offset and the further offset information indicating a name or other identifier for the alert source file.

21. The communication device of claim 19, wherein a plurality of offset pairs indicating offsets into the alert source file and possibly into other alert source files are stored for use as a single alert notification to signal to the user of the communication device the occurrence of the event, whereby a concatenation of two or more segments of one or more alert source files is indicated as an alert notification.

22. The communication device of claim 19, wherein the communication device includes functionality for wireless communication with another wireless communication device via a communication path that at least in part includes wireless signalling.

23. A communication device, comprising a processor, configured to:

store in the communication device an offset and a further offset in respect to a starting point of an alert source file containing information used to indicate at least audio or video signals, and so indicate a partial segment of the alert source file; and use the indicated segment of the alert source file as an alert notification to signal to a user of the communication device the occurrence of an event.

24. The communication device of claim 23, wherein the processor is further configured to store with the offset and the further offset information indicating a name or other identifier for the alert source file.

25. The communication device of claim 23, wherein a plurality of offset pairs indicating offsets into the alert source file and possibly into other alert source files are stored for use as a single alert notification to signal to the user of the communication device the occurrence of the event, whereby a concatenation of two or more segments of one or more alert source files is indicated as an alert notification.

26. The communication device of claim 23, wherein the communication device includes functionality for wireless communication with another wireless communication device via a communication path that at least in part includes wireless signalling.

* * * * *